United States Patent
Le et al.

(10) Patent No.: US 7,558,867 B2
(45) Date of Patent: Jul. 7, 2009

(54) AUTOMATIC FIRMWARE UPGRADE FOR A THIN CLIENT USING ONE OR MORE FTP SERVERS

(75) Inventors: Bach H. Le, San Jose, CA (US); Mandy Sui Mei Lam, Fremont, CA (US); Ryan Mason, San Jose, CA (US)

(73) Assignee: Wyse Technology Inc., San Jose, CA (US)

( * ) Notice: Subject to any disclaimer, the term of this patent is extended or adjusted under 35 U.S.C. 154(b) by 1133 days.

(21) Appl. No.: 10/827,381

(22) Filed: Apr. 20, 2004

(65) Prior Publication Data

US 2005/0235280 A1 Oct. 20, 2005

(51) Int. Cl.
*G06F 15/16* (2006.01)
*G06F 15/173* (2006.01)
*G06F 15/177* (2006.01)

(52) U.S. Cl. .................. 709/230; 709/203; 717/168; 717/173; 717/171

(58) Field of Classification Search ......... 709/200–203, 709/217–224, 228–232; 717/168–174
See application file for complete search history.

(56) References Cited

U.S. PATENT DOCUMENTS

| | | | | |
|---|---|---|---|---|
| 6,341,290 | B1 * | 1/2002 | Lombardo et al. | 707/104.1 |
| 6,889,251 | B1 * | 5/2005 | Zhang | 709/220 |
| 2004/0015940 | A1 * | 1/2004 | Heisey et al. | 717/168 |
| 2004/0054762 | A1 * | 3/2004 | Parry et al. | 709/221 |
| 2004/0073902 | A1 * | 4/2004 | Kao et al. | 717/171 |
| 2004/0088680 | A1 * | 5/2004 | Pieper et al. | 717/114 |
| 2006/0002340 | A1 * | 1/2006 | Criss et al. | 370/328 |
| 2008/0005293 | A1 * | 1/2008 | Bhargava et al. | 709/223 |

\* cited by examiner

*Primary Examiner*—Haresh N Patel
(74) *Attorney, Agent, or Firm*—McDermott Will & Emery LLP

(57) ABSTRACT

A process and system for upgrading firmware in a thin client in a network environment. The process may proceed on an automated basis during boot-up by using one or more FTP addresses stored in the thin client. Multiple FTP servers may be accessed. The same firmware upgrades may be stored on more than one FTP server. Different firmware upgrades may instead or in addition be stored on different FTP servers.

6 Claims, 4 Drawing Sheets

AUTOMATIC FIRMWARE UPGRADE FOR A THIN CLIENT USING ONE OR MORE FTP SERVERS

BACKGROUND

1. Field

This application relates to firmware, firmware upgrades, networks, thin clients and FTP servers.

2. Description of Related Art

Programming instructions and data are often stored in one or more memory devices for use by a computer processing system.

Some of this information is often stored in a non-volatile memory chip. Information stored in this manner is often referred to as "firmware."

One class of computers for which firmware is particularly important is thin clients. These computing devices typically lack a hard disk drive. Instead, much of the needed software is often stored locally as firmware. This firmware often includes the entire operating system and selected application programs, typically referred to as "add-ons." The firmware in a thin client is often in the 7-20 megabyte range.

There is often a need to modify the content of firmware. This is particularly true in connection with thin clients because of the large proportion of the software that typically is stored in the firmware. Changes may be needed, for example, to fix bugs, to incorporate enhancements, to change brands, to accommodate hardware changes, to add needed applications, and/or to remove unneeded applications.

To this end, the memory device(s) that contain the firmware are often configured to be updatable by the computer system in which they operate. Flash memory devices are often used for this purpose.

Updating firmware can be challenging, particularly when the size of the firmware is large, the needed changes are frequent, numerous stations must be upgraded, and/or when different stations have different upgrade needs.

SNMP (Simple Network Management Protocol) has been used in the past to remotely upgrade firmware from an administrator's station. However, this can be time-consuming, particularly when there are a large number of stations that must be frequently upgraded with different versions of the upgrades. It can also require remote administrator software on the server to distribute the firmware.

Another approach has been to provide each station with a firmware upgrade utility. The user typically loads the utility manually and supplies the address of an FTP server at which the firmware upgrade resides, along with other needed information (e.g., a user name and password for logging into the FTP server). This approach, however, often requires users that are careful, diligent and skilled with computers. In a large system, it can also place an undue load on the FTP server, causing delays or failures in the downloading of the firmware upgrade. If the FTP server is not functioning, moreover, the firmware cannot be upgrade.

An automated firmware upgrade process has also been used. Upon boot up, a firmware upgrade loader program is executed. The program typically sends out a request to a DHCP (Dynamic Host Configuration Protocol) server for information about the FTP server that is storing the firmware upgrade, such as its IP address, the path to the file, the user ID and a password. This approach, however, critically relies upon the presence and operation of the DHCP server. It can also suffer from many of the same problems as the approaches discussed above, including delays or failures caused by an overloaded or malfunctioning FTP server.

SUMMARY

A process for upgrading firmware in a thin client may include sending an FTP request for a first firmware upgrade from the thin client to a first FTP server, receiving the first firmware upgrade in response at the thin client from the first FTP server, upgrading the firmware in the thin client with the first firmware upgrade, sending an FTP request for a second firmware upgrade from the thin client to a second FTP server that is different from the first FTP server, receiving the second firmware upgrade in response at the thin client from the second FTP server, and upgrading the firmware in the thin client with the second firmware upgrade.

The process may also include sending an FTP request for information about the first firmware upgrade from the thin client to the first FTP server, receiving the information about the first firmware upgrade in response at the thin client from the FTP server, comparing the information about the first firmware upgrade with information about the firmware in the thin client, and upgrading the firmware in the thin client with the first firmware upgrade only if the comparing indicates that the firmware in the thin client should be upgraded with the first firmware upgrade.

The process may also include sending an FTP request for information about the second firmware upgrade from the thin client to the second FTP server, receiving the information about the second firmware upgrade in response at the thin client from the FTP server, comparing the information about the second firmware upgrade with information about the firmware in the thin client, and upgrading the firmware in the thin client with the second firmware upgrade only if the comparing indicates that the firmware in the client should be upgraded with the second firmware upgrade.

The first firmware upgrade may be different than the second firmware upgrade. The first firmware upgrade may be an operating system and the second firmware upgrade may be an add-on.

The process may also include receiving an address for the first FTP server and an address for the second FTP server, storing the addresses within the thin client, reading the address for the first FTP server from within the thin client, sending the request to the first FTP server at the address for the first FTP server that was read, reading the address for the second FTP server from within the thin client, and sending the request to the second FTP server at the address for the second FTP server that was read. The receiving the addresses may include presenting a dialog box to an operator of the thin client and receiving addresses entered into the dialog box by the operator. The receiving the addresses may include receiving the addresses over a computer network from a location that is remote from the thin client.

A process for upgrading firmware in a thin client may include sending an FTP request for a firmware upgrade or information about the upgrade from the thin client to a first FTP server, not receiving the firmware upgrade or information about the upgrade in response at the thin client from the first FTP server, sending an FTP request for the same firmware upgrade from the thin client to a second FTP server that is different from the first FTP server, receiving the firmware upgrade in response at the thin client from the second FTP server, and upgrading the firmware in the thin client with the firmware upgrade.

The firmware upgrade or information about the upgrade may be not be received from the first FTP server because the first FTP server is busy performing other downloads.

The firmware upgrade or information about the upgrade may not be received from the first FTP server because the first FTP server is not functioning.

A process for upgrading firmware in a thin client may include booting up the thin client and automatically launching a firmware upgrade loader program in the thin client without operator intervention during the booting up that reads the address of an FTP server from a memory within the thin client, sends an FTP request for a firmware upgrade from the thin client to the FTP server at the address that was read, receives the firmware upgrade in response at the thin client from the FTP server, and upgrades the firmware in the thin client with the firmware upgrade.

The process may include re-booting the thin client after the firmware is upgraded.

The firmware upgrade loader program may read an address of a second FTP server from a memory within the thin client that is different from the address of the first-mentioned FTP server, send an FTP request for a second firmware upgrade from the thin client to the second FTP server at the address of the second FTP server that is read, receive the second firmware upgrade in response at the thin client from the second FTP server, and upgrade the firmware in the thin client with the second firmware upgrade.

A system for upgrading firmware in a thin client may include storage media containing computer programming instructions that implement one or more of the foregoing process steps when the instructions are performed by a processing system in communication with a network interface, a network interface, and a processing system configured to communicate with the storage media and the network interface and to perform the programming instructions in the thin client.

Computer-readable storage media may contain computer programming instructions that implement one or more of the foregoing process steps when the instructions are performed by a processing system in communication with a network interface in a thin client.

These, as well as still further objects, features, benefits, components and steps will now become clear from a review of the following detailed description of illustrative embodiments and the accompanying drawings.

DETAILED DESCRIPTION OF ILLUSTRATIVE EMBODIMENTS

Figure 1:
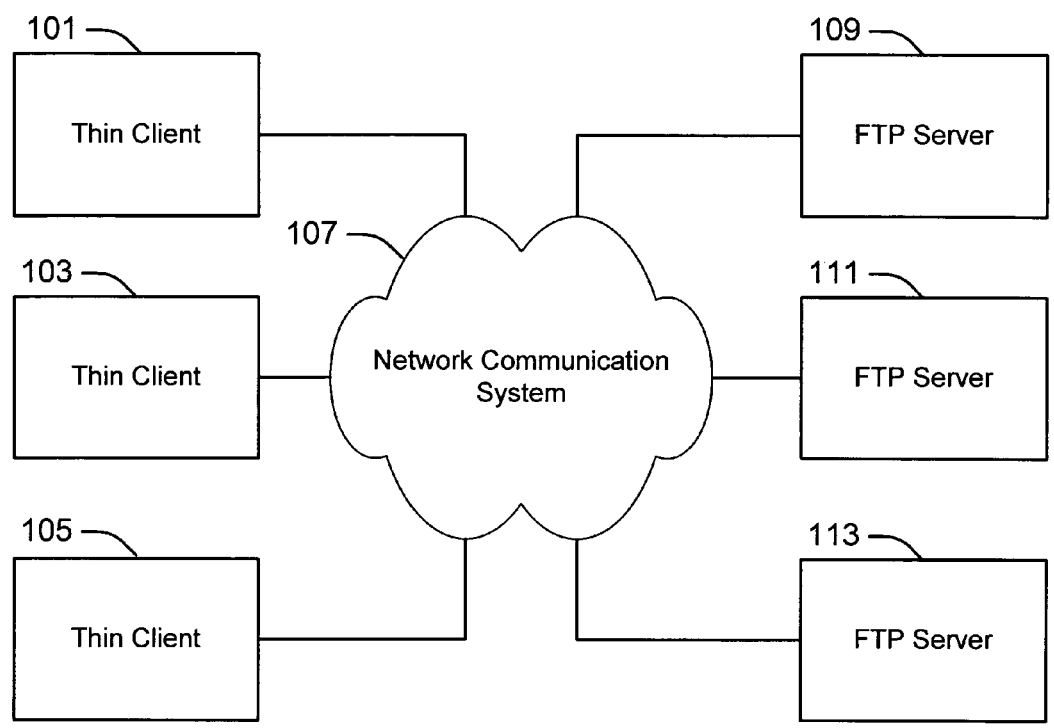
FIG. 1 illustrates one embodiment of a computer network that includes thin clients and FTP servers.

FIG. 1 illustrates one embodiment of a computer network that includes thin clients and FTP servers. As shown in FIG. 1, a plurality of thin clients, such as thin clients 101, 103 and 105, may be connected to a network communication system, such as network communication system 107. A plurality of FTP servers may also be connected to the network communication system 107, such as FTP servers 109, 111 and 113.

Each thin client may be a computer system that includes one or more input devices, such as a keyboard and/or mouse, one or more output devices, such as a display screen and/or printer, and one or more internal processors and associated components. A network interface may also be provided. Typically, however, the thin client will not include a hard disk drive. Examples of thin clients are the WINTERM line of thin clients manufactured by Wyse Technology.

The network communication system may be any type of network communication system. It may be a LAN, WAN, the Internet, wired, wireless and/or any combination of these.

Each FTP server may be a computing system that stores and provides files on request using FTP (File Transfer Protocol). The computing system may include one or more processors, a network interface and a storage device for storing the files, such as a hard disk drive.

The files that are stored by one or more of the FTP servers may include the complete firmware that is to be installed in one or more of the thin clients as an upgrade. Each complete file is often referred to as a "padded image." This complete firmware may include the operating system of the thin client, various add-ons, such as an ICA or terminal emulation application, and/or other software applications. Different versions of the complete firmware upgrade file may be stored on the FTP server to accommodate differences in the platforms for each thin client and/or differences in the users of each thin client.

One or more of the FTP servers may also store partial firmware upgrades. Each partial firmware upgrade may contain only a single add-on or a subset of add-ons. A partial upgrade may also consist of only an operating system (often referred to as a "primer image"), any other software component, and/or any other combination of software. Again, different versions of each partial firmware upgrade file may be stored on the FTP server to accommodate differences in the platforms for each thin client and/or differences in the users of each thin client.

Each FTP server may also store information about each stored firmware upgrade file in a separate file, often referred to as a parameter file. The parameter file may include information such as the build version of the firmware upgrade file, its size and/or other information about it. Alternatively, or in addition, this parameter information may be stored as part of the firmware upgrade file.

All versions of the complete firmware upgrade may be stored on one FTP server, such as the FTP server 109; all versions of a first add-on may be stored on a second FTP server, such as the FTP server 111, and all versions of a second add-on may be stored on a third FTP server, such as the FTP server 113. All versions of each additional add-on could similarly be stored on an additional FTP server (not shown in FIG. 1). This configuration may enhance the flexibility of the system and make changes easier to implement.

When different versions of the same firmware upgrade are stored on a single FTP server, each version may be placed in a different subdirectory on the FTP server, along with its associated parameter file. Each upgrade file may bear the same name and each parameter file may also bear the same name. With this approach, only a pointer to the server and subdirectory is needed. The name of the upgrade file and the parameter file may be independently known.

The same version of an upgrade file and its associated parameter file may also be duplicated and stored on multiple FTP servers. By making the same files available on multiple FTP servers, delays and failures in getting the firmware upgrade file and its associated parameter file due to overloading or malfunctioning of an FTP server may be reduced or eliminated.

A combination of the FTP server configurations discussed above may also be used, as well as different, additional or alternative configurations.

Figure 2:
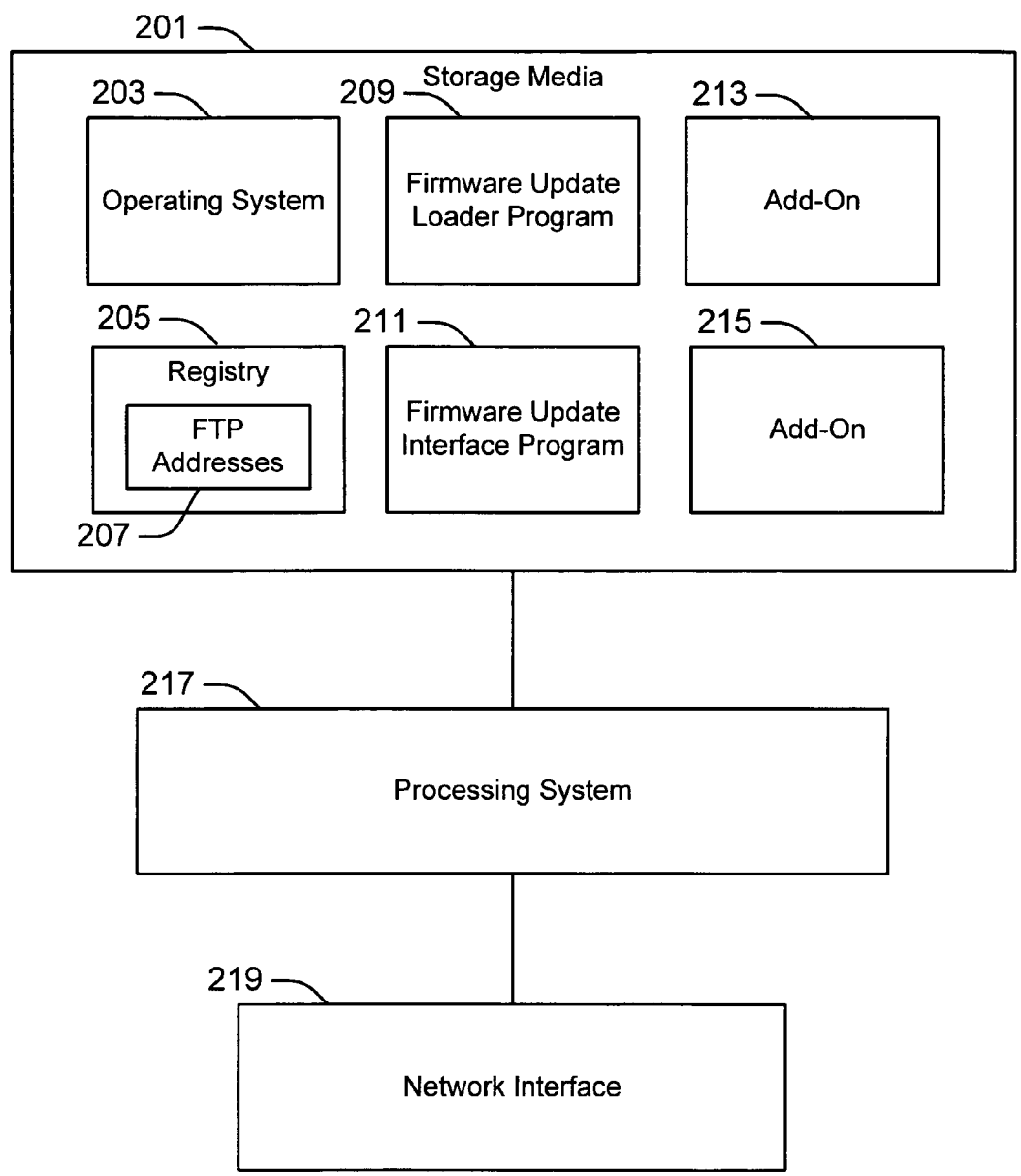
FIG. 2 illustrates portions of one embodiment of a thin client.

FIG. 2 illustrates portions of one embodiment of a thin client. As shown in FIG. 2, a storage media 201 may include an operating system 203, an associated registry 205 containing one or more FTP addresses 207, a firmware update loader program 209, a firmware update interface program 211 and one or more add-ons, such as add-ons 213 and 215. A processing system 217 may also be included and configured to be in communication with the storage media 201. A network interface may also be included and configured to be in communication with the processing system 217.

The storage media 201 may be a single or multiple memory devices. It may include volatile and/or non-volatile memory. It may be updatable in whole or in part by the processing system 217. A flash memory or a set of flash memories may be used for the entire storage media 201 or for any portion or portions of it.

The operating system 203 may be a program designed to interface between the hardware of the thin client and its application programs. MICROSOFT WINDOWS CE is an example.

The registry 205 may be one or more files of information that are used by the operating system 203, including during boot-up of the thin client.

Each of the FTP addresses 207 may point to an FTP server, such as the FTP server 109, 111 or 113. The address may be in any form and have any number of components. For example, the address may include the name or IP address of the FTP server. It may also include a path to desired files.

The path may be a relative path, in which case the characteristics of the current platform and its firmware image may be used to construct the absolute path. For example, the relative path:

\<Root path>\<OEM Name>\<OS>\<Platform>\<Display>\<Locale> may be converted by the thin client into the absolute path:

\<Root path>\<Wyse>\<CE>\<Midway>\<Non-FP>\<USA>

The path may instead be an absolute path, in which case the characteristics of the current platform and its firmware image may be ignored. Appending a "$" to the end of the path may be used as a technique to signify that the path is an absolute path as opposed to a relative path, in which event the "$" may be omitted from the actual path that is used.

Additional information, such as a User ID and Password, may also be stored within the registry 205 to facilitate the FTP login and download process. The name of each desired file may also be stored, or this name may be a default name that is supplied during formulation of an FTP request.

If more than one FTP address is stored, each address may point to a different FTP server, to different areas (e.g., subdirectories) on the same FTP server, to different files in the same area on the same FTP server, and/or to any combination of these approaches.

Although the FTP addresses 207 are shown as being stored as part of the registry 205, one or more of the FTP addresses 207 may be stored apart from the registry 205.

The firmware update loader program may be a program that cooperates with other systems and software to download the firmware updates from the FTP servers and to install them in the thin client. The firmware update loader program 209 may be specified in the registry 205 as a program that is to be run during boot-up by, for example, listing it in the "Auto Run" section of the registry 205. In this event, the firmware update loader program 209 will be automatically loaded and executed during boot-up without operator intervention.

The firmware update loader program 209 may be configured instead not to load on boot-up or to only load on boot-up when so configured by the user of the thin client. The firmware update loader program 209 may also be configured to load both on boot-up and on manual request of the user of the thin client. More details about one embodiment of the firmware update loader program 209 are discussed below.

The firmware update interface program 211 may be a program that the user of the thin client manually loads when desired. It may be identified by an icon in the Control Panel, in the program menu and/or on the desktop of the thin client. It may also or instead be included as an accessible feature in another software application. When run, the firmware update interface program 211 may allow the user of the thin client to specify one or more of the FTP addresses 207 and associated information (e.g., User ID and Password) and/or to specify when and how firmware upgrades are made. One embodiment of a user interface that may be generated by the firmware update interface program 211 is discussed below.

Each add-on, such as add-ons 213 and 215, may include a software program that performs a particular function, such as ICA® or terminal emulation. The firmware update interface program 211 and the firmware update loader program 209 may be considered and managed as a type of add-on as well. References to each add-on may be stored in the add-on section of the registry 205.

The network interface 219 may provide an interface between the processing system 217 of the thin client and the network communication system to which the thin client is coupled, such as the network communication system 107 in FIG. 1. The network interface 219 may include a network interface card configured for wired or wireless communication.

The processing system 217 may be configured to selectively perform programming instructions contained within the storage media 201. The processing system may include one or more microprocessors and associated support devices. It may also include temporary storage devices, such as one or more RAMs.

The storage media 201, the processing system 217 and the network interface 219 may be contained within a single housing or may be contained in separate housings. Additional components (not shown) may be included with the thin client, such as a keyboard, mouse, display and/or printer.

Boot-up of the thin client may be initiated automatically when the thin client is turned on; manually by the operator, such as by pressing a hardware reset button or by directing the operating system to reboot; or by a reboot call from a program. During boot-up and as explained above, the firmware upgrade loader program 209 in FIG. 2 may be loaded and run.

Figure 3:
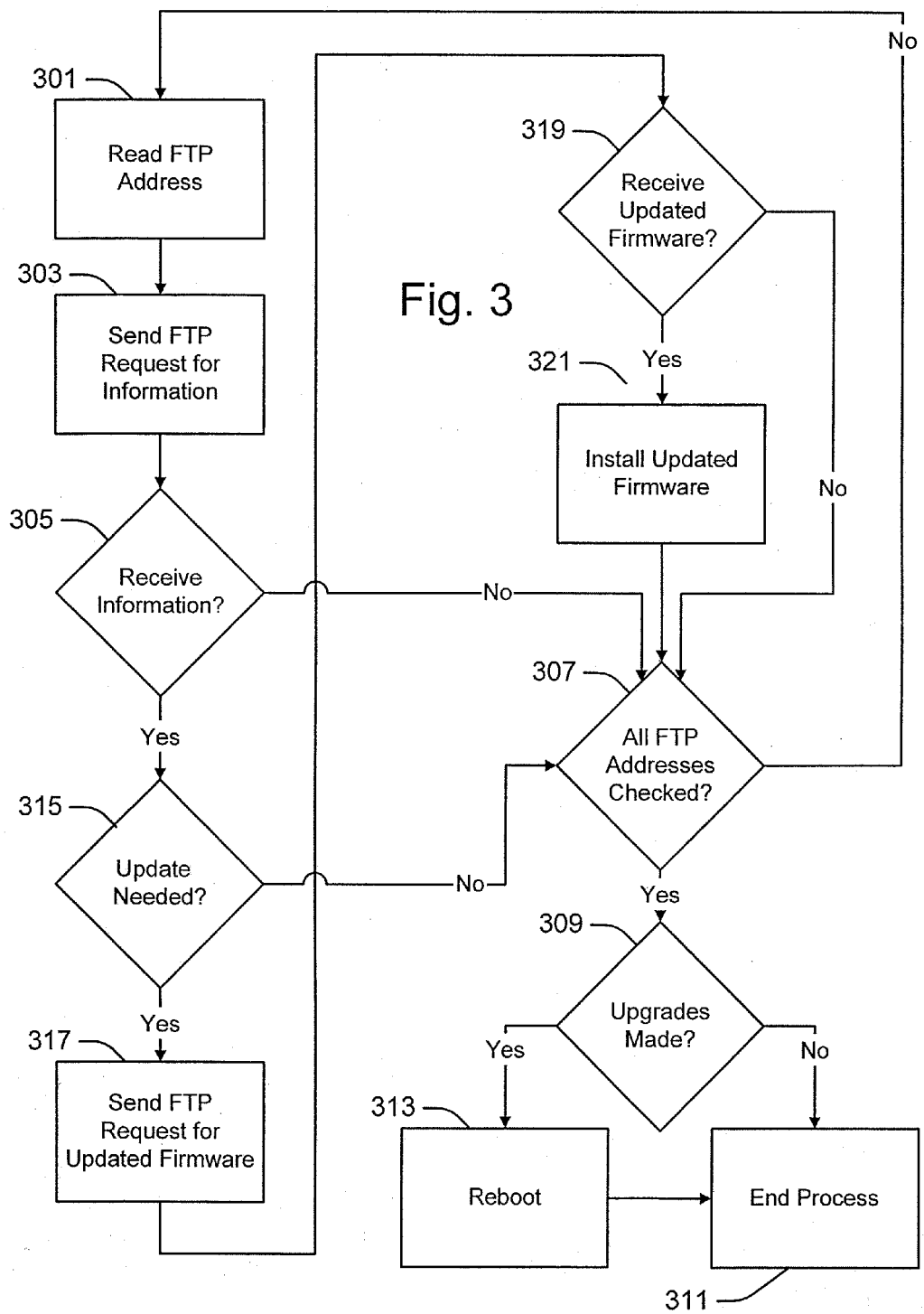
FIG. 3 illustrates a firmware upgrade process implemented by one embodiment of the firmware loader program shown in FIG. 2.

FIG. 3 illustrates a process implemented by one embodiment of the firmware update loader program 209 shown in FIG. 2. As shown in FIG. 3, the firmware update loader program may begin by reading an FTP address, as reflected by a Read FTP Address block 301. If there is a list of FTP addresses, this may be the first address.

If the FTP addresses are being stored in the registry 205, then the reading may take place from the registry 205. If the FTP addresses are being stored at another location, then the reading may take place from the other location.

A request for information about the firmware upgrade that is the subject of the FTP address may be sent over the network communication system 107, as reflected by a Send FTP Request for Information block 303. The FTP Request for Information may be sent to the FTP address that was read during the Read FTP Address block 301. Other information that may be needed for the FTP request, such as a User ID and Password, may be included with the information that was read or may be supplied from a separate source. The request for information may more specifically seek a parameter file located at the same address as the firmware upgrade file that provides one or more parameters about the firmware upgrade file, such as its build version and size.

A check may be made to determine whether the requested information is received, as reflected by a Receive Information? decision block 305. Reasons why the information may not be received may include that the targeted FTP server is busy filling other requests or is malfunctioning.

If the information is not received in response to the request, a determination may be made as to whether all FTP addresses have been checked, as reflected by an All FTP Addresses Checked? decision block 307. If all of the addresses have not been checked, control may return to the Read FTP Address block 301 to read and process the next FTP address that has been stored. The process may then proceed in the same manner as the process after the first FTP address was read, as partially explained above and as will be explained further below.

If all of the FTP addresses have been checked, on the other hand, a check may be made to determine whether any firmware has been upgraded, as reflected by an Upgrades Made? decision block 309. If no firmware has been upgraded after all of the FTP addresses have been checked, the process may end, as reflected by an End Process block 311.

If firmware was upgraded by the end of the checking, on the other hand, the thin client may be rebooted, as reflected by a Reboot block 313. This may be done to insure that the new firmware is loaded and used immediately following the upgrade. The rebooting may be done manually or may be called from the firmware upgrade loader program.

Returning now to the Receive Information? decision block 305, the requested information may instead have been received. The information that was received may be compared to the firmware that currently resides in the thin client to determine whether the upgrade at the read FTP address is needed, as reflected by an Update Needed? decision block 315.

For example, the build number that may be contained within the requested information may be compared to the build number of the firmware that currently resides in the thin client. If they are the same, then an update may not be needed and control may transfer to the All FTP Addresses Checked? decision block 307.

If the build numbers are different, on the other hand, the software may be configured to conclude that an update is needed, in which event an FTP request may be sent from the thin client for the updated firmware, as reflected by a Send FTP Request for Updated Firmware block 317. The FTP request may be addressed to the same address that was previously read at the Read FTP Address block 301 and used in the previous Send FTP Request for Information block 303, along with the same User ID and Password.

In practice, the Send FTP Request for Updated Firmware block 317 may be a series of FTP requests, each for only a portion of the file. This approach may be implemented in thin clients that do not contain enough available RAM to receive the entire file in response to a single FTP request.

A decision may next be made as to whether the firmware has been received in response to the FTP request, as reflected by a Receive Updated Firmware? decision block 319. If it has not, this may indicate that the targeted FTP server is busy or malfunctioning. In either event, control may be transferred to the All FTP Addresses Checked? decision block 307.

If the updated firmware is received, on the other hand, the firmware update loader program may cause the received updated firmware to be installed in the thin client, as reflected by an Install Updated Firmware block 321. Thereafter, control may transfer to the All FTP Addresses Checked? decision block 307.

This process may repeat until each of the FTP addresses are read and processed. Before one or more of the steps of the process, the firmware update loader program may seek permission from the operator of the thin client to proceed by, for example, presenting an appropriate dialog box to the operator.

The checks that may be made to verify that information about each firmware upgrade file has been received and that each firmware upgrade file itself has been received may be useful to avoid hanging of the firmware update loader program in the event of a delay or malfunction in a targeted FTP server. When the identical firmware upgrade is stored on more than one targeted FTP server, moreover, this process will intrinsically bypass an unavailable or malfunctioning server and obtain the same upgrade from a subsequent server, this process is recognized as failover feature. This can effectuate load distribution and redundancy in the firmware upgrade process. The FTP addresses that are stored locally in the thin client may come from a variety of sources. For example, the FTP addresses may be part of the firmware that is initially installed in the thin client.

The initial FTP addresses or upgrades to them may also be sent to the thin client from a remote location through the network communication system.

The FTP addresses may also be initially entered and/or updated by input from the user of the thin client. Control over how and when firmware upgrades are made may also be entered by the user. The firmware update interface program 211 may be used for this purpose.

Figure 4:
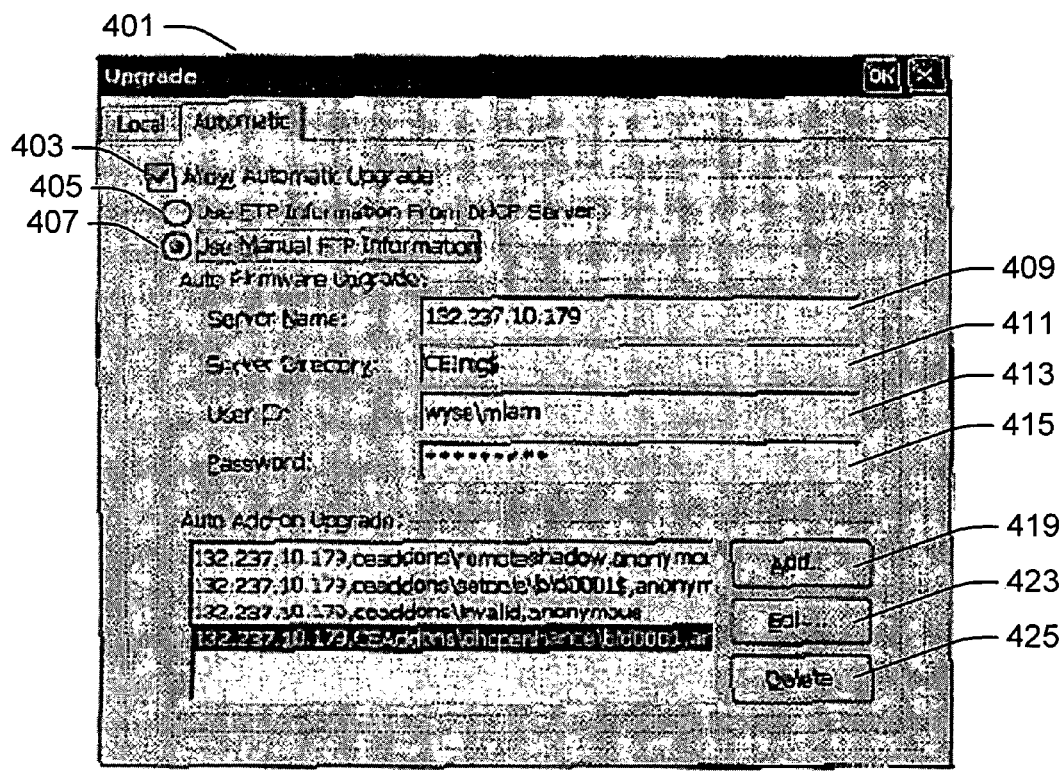
FIG. 4 illustrates one embodiment of a user interface that may be generated by the firmware upgrade interface program shown in FIG. 2.

FIG. 4 illustrates one embodiment of a user interface that may be generated by the firmware upgrade interface program 211 shown in FIG. 2. As shown in FIG. 4, the user may indicate her desire that upgrades be automatically made by selecting an Automatic tab 401 and by checking an Allow Automatic Upgrade box 403. The user may then decide whether to use FTP information from a DHCP server or to use manually-entered FTP information by selecting a radio button Use FTP Information From DHCP Server 405 or a radio button Use Manual FTP Information 507, respectively.

If automatic upgrades using the manually-entered FTP information are selected, the user may enter the address of the FTP server containing a complete padded image by specifying its name or IP address in a Server Name box 409 and the directory for the upgrade file in a Server Directory box 411. The user may also specify a user ID and password in a User ID box 413 and a Password box 415.

The user may also enter the FTP addresses of several partial firmware upgrade files, such as firmware upgrade files that contain only a single add-on. This may be done for each file by clicking an "Add" button 419.

Figure 5:
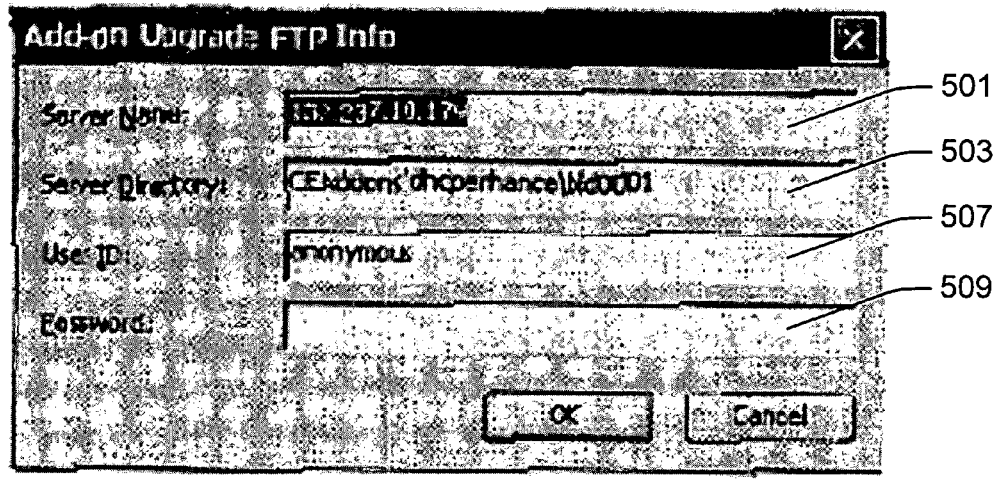
FIG. 5 illustrates one embodiment of a second user interface that may be generated by the firmware upgrade interface program shown in FIG. 2.

FIG. 5 illustrates one embodiment of a second user interface that may be generated by the firmware upgrade interface program shown in FIG. 2. This second user interface may appear after the "Add" button 419 in FIG. 4 is clicked. It may provide for the entry of information needed to target the desired server, such as a Server Name 501 box, a Server Directory box 503, a User ID box 507 and a Password box 509.

Summary information about the address of each add-on FTP server that has been added may be listed on the first interface, such as in an Auto Add-on Upgrade box 421. If desired, any entry in the list may be edited by selecting the entry and clicking an Edit button 423, following which the second interface shown in FIG. 5 may reappear. Any entry in the list may also be deleted by highlighting the entry and clicking a Delete button 425.

Although only one set of fields are provide to address an FTP server that contains the complete primer image, two or more sets of fields could instead be provided to target two or more FTP servers that contain the same complete primer image, much in the same manner as two or more sets of fields have been provided for the Auto Add-on Upgrade FTP servers. Such a configuration may provide protection against a failing or overburdened FTP server. Similarly, two or more of the entries in the Auto Add-on Upgrade box 421 may point to different FTP servers with the same add-on firmware upgrade file. Two or more FTP serves may similarly be loaded with the same add-on firmware upgrade file.

Information that is entered into the interfaces illustrated in FIGS. 4 and 5 may automatically be written to a file, such as the registry 205, so as to be available during boot up.

When the same firmware upgrade file (a full or partial upgrade) is loaded on different FTP servers and when the addresses of these different servers are specified in the thin client, the process described above in connection with FIG. 3 may intrinsically effectuate load balancing and redundancy.

During normal operation, the request to one of the FTP servers at the first listed address will succeed in securing the desired download of the targeted firmware upgrade file and the firmware in the thin client will be update with it. Subsequently, the process will cause information about the identical firmware upgrade file that is stored on another FTP at a later stored FTP address to be returned. However, a comparison of this information with the then current firmware in the thin client will demonstrate that the upgrade is not needed. Thus, the identical copy of the firmware upgrade file will not again be downloaded and installed.

On the other hand, if the first targeted FTP server is busy or malfunctioning, it may not be able to download the needed firmware update file. In this instance, the later request to the other FTP server for information about its identical firmware upgrade file will return information that does not match the firmware then in the thin client. As a consequence, the need firmware update will be downloaded from the FTP server that is later accessed.

Computer-readable storage media, such as a floppy, CD, DVD or hard disk drive, may contain computer programming instructions that implement one or more the process steps that have been discussed above when the instructions are performed by a processing system in communication with a network interface in a thin client. These instructions may be installed in a thin client as part of its firmware or otherwise made accessible to the thin client.

Certain embodiments have now been described. However, the protection afforded by the claims that now follow is not limited to these embodiments, but rather embraces other embodiments with different objects, features, benefits, components and/or steps.

We claim:

1. A system for upgrading firmware in a thin client comprising:
   storage media containing computer programming instructions for loading during boot up of the thin client and for implementing the following tasks when the instructions are performed by a processing system in communication with a network interface:
   reading an address of an FTP server from a memory within the thin client;
   sending an FTP request for a firmware upgrade from the thin client to the FTP server at the address that was read;
   receiving the firmware upgrade in response at the thin client from the FTP server; upgrading the firmware in the thin client with the firmware upgrade;
   reading an address of a second FTP server from a memory within the thin client that is different from the address of the FTP server;
   sending an FTP request for a second firmware upgrade from the thin client to the second FTP server at the address of the second FTP server that was read;
   receiving the second firmware upgrade in response at the thin client from the second FTP server; and
   upgrading the firmware in the thin client with the second firmware upgrade;
   a network interface; and
   a processing system configured to communicate with the storage media and the network interface, to boot up the thin client, and to perform the programming instructions during the boot up.

2. The system of claim 1, wherein the tasks further include: directing re-booting of the thin client after the firmware is upgraded with the second firmware upgrade.

3. A process for upgrading firmware in a thin client comprising:
   booting up the thin client; and
   automatically launching a firmware upgrade loader program in the thin client without operator intervention during the booting up that:
   reads an address of an FTP server from a memory within the thin client;
   sends an FTP request for a firmware upgrade from the thin client to the FTP server at the address that was read;
   receives the firmware upgrade in response at the thin client from the FTP server;
   upgrades the firmware in the thin client with the firmware upgrade;
   reads an address of a second FTP server from a memory within the thin client that is different from the address of the FTP server;
   sends an FTP request for a second firmware upgrade from the thin client to the second FTP server at the address of the second FTP server that was read;
   receives the second firmware upgrade in response at the thin client from the second FTP server; and
   upgrades the firmware in the thin client with the second firmware upgrade.

4. The process of claim 3, further comprising re-booting the thin client after the firmware is upgraded with the second firmware upgrade.

5. Computer-readable storage media containing computer programming instructions for loading during boot up of the thin client and for implementing the following tasks when the instructions are performed by a processing system in communication with a network interface:
   reading an address of an FTP server from a memory within the thin client;

sending an FTP request for a firmware upgrade from the thin client to the FTP server at the address that was read;

receiving the firmware upgrade in response at the thin client from the FTP server;

upgrading the firmware in the thin client with the firmware upgrade;

reading an address of a second FTP server from a memory within the thin client that is different from the address of the FTP server;

sending an FTP request for a second firmware upgrade from the thin client to the second FTP server at the address of the second FTP server that was read;

receiving the second firmware upgrade in response at the thin client from the second FTP server; and upgrading the firmware in the thin client with the second firmware upgrade.

6. The computer-readable storage media of claim 5, wherein the tasks further include: directing re-booting of the thin client after the firmware is upgraded with the second firmware upgrade.

* * * * *

UNITED STATES PATENT AND TRADEMARK OFFICE
CERTIFICATE OF CORRECTION

PATENT NO. : 7,558,867 B2  Page 1 of 1
APPLICATION NO. : 10/827381
DATED : July 7, 2009
INVENTOR(S) : Bach H. Le et al.

It is certified that error appears in the above-identified patent and that said Letters Patent is hereby corrected as shown below:

On Column 8, line 53; Replace "507" with --407--

Signed and Sealed this

Seventeenth Day of August, 2010

David J. Kappos
*Director of the United States Patent and Trademark Office*